April 5, 1960     W. A. PAPWORTH     2,931,402
POWER DRIVEN RECIPROCABLE CUTTING TOOL
Filed March 22, 1957     2 Sheets-Sheet 1
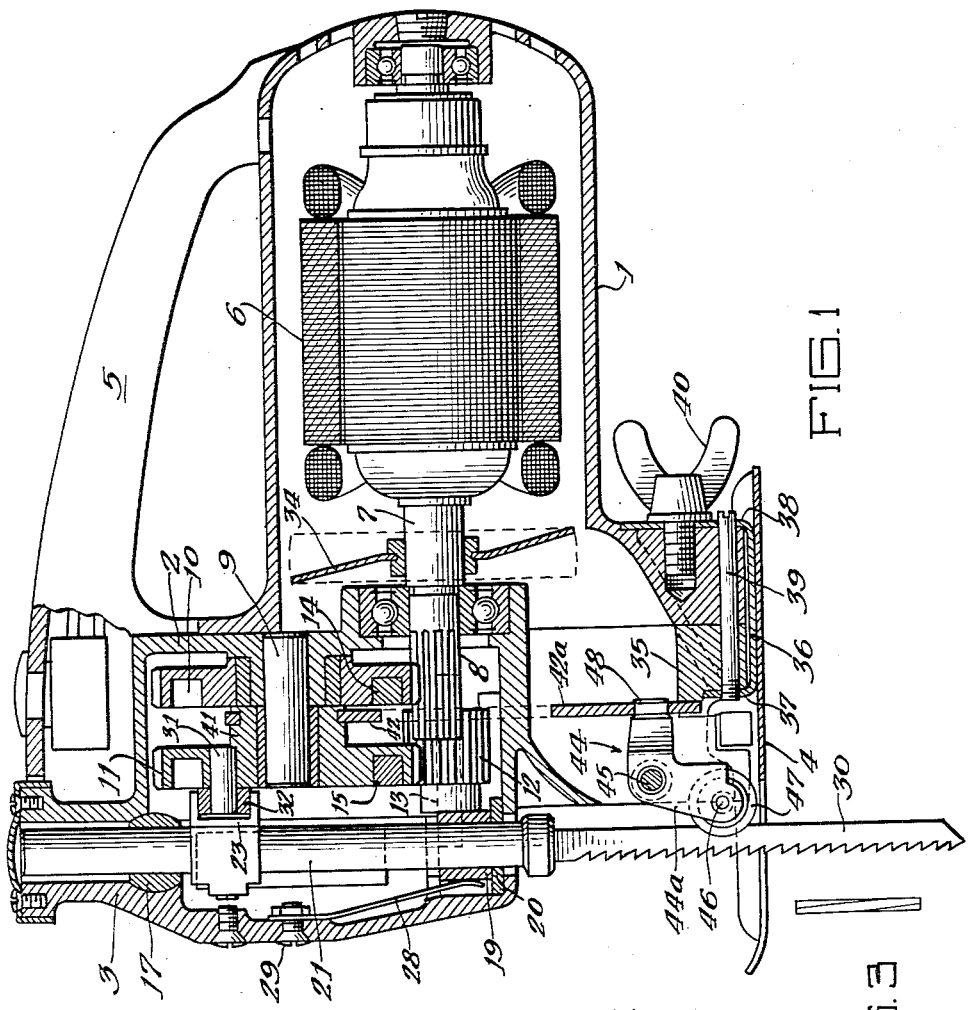
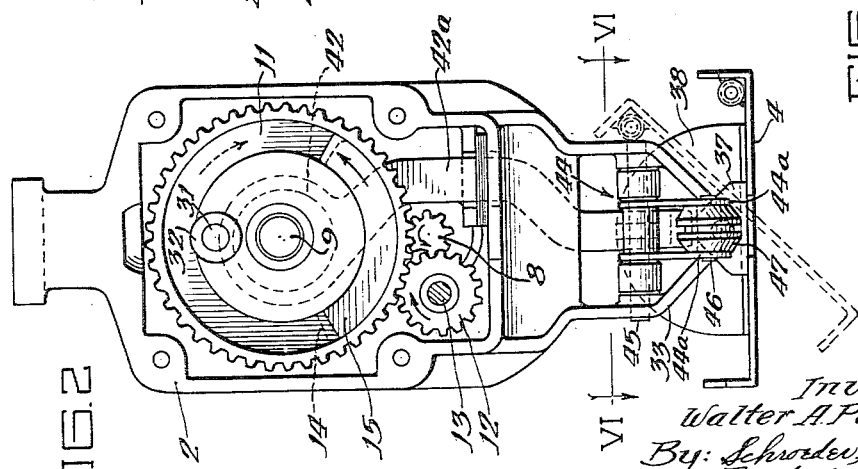
Inventor:
Walter A. Papworth
By: Schroeder, Hofgren,
Brady & Wegner
Attorneys

United States Patent Office 2,931,402
Patented Apr. 5, 1960

2,931,402

POWER DRIVEN RECIPROCABLE CUTTING TOOL

Walter A. Papworth, Syracuse, N.Y.

Application March 22, 1957, Serial No. 648,475

9 Claims. (Cl. 143—68)

This invention relates to power driven reciprocable cutting tools, and more specifically it relates to bayonet saws in which the cutting tool is unattached at its protruding end, and in which mechanism is provided for giving the cutting tool a relatively long and balanced endwise movement coupled with a movement for driving the cutting tool edgewise into the work during its cutting stroke and retracting it from the work during its return stroke.

The object of this invention is to combine the advantages of long stroke with the advantage of orbital cutting without increasing the size of the machine.

A further object is to provide a mechanism for reciprocating the tool plunger having oppositely rotating coaxial spur or helical gears, one of which operates the tool plunger, and both of which are provided with counterbalances whose opposite rotation and combined mass offset the reciprocating unbalance of the tool plunger and cutting tool.

A further object is to provide an arrangement wherein enough counterbalancing is applicable to offset the unbalance of a substantial tool plunger and crosshead moving with a long stroke.

A further object of the invention is to provide a tool of heavy duty characteristics, wherein the bearings are of ample area and low surface velocity, and the gear ratio may be relatively large.

A further object is to provide such a tool within commonly accepted and desirable size limits, and at a low cost.

The invention is illustrated in a preferred embodiment in the accompanying drawings, in which:

Fig. 1 is a vertical central section of a machine embodying the invention;

Fig. 2 is a front elevational view of the machine with the front cap removed;

Fig. 3 is a diagram showing the path of movement of the cutting tool, and its size relative to Fig. 1;

Figure 4:
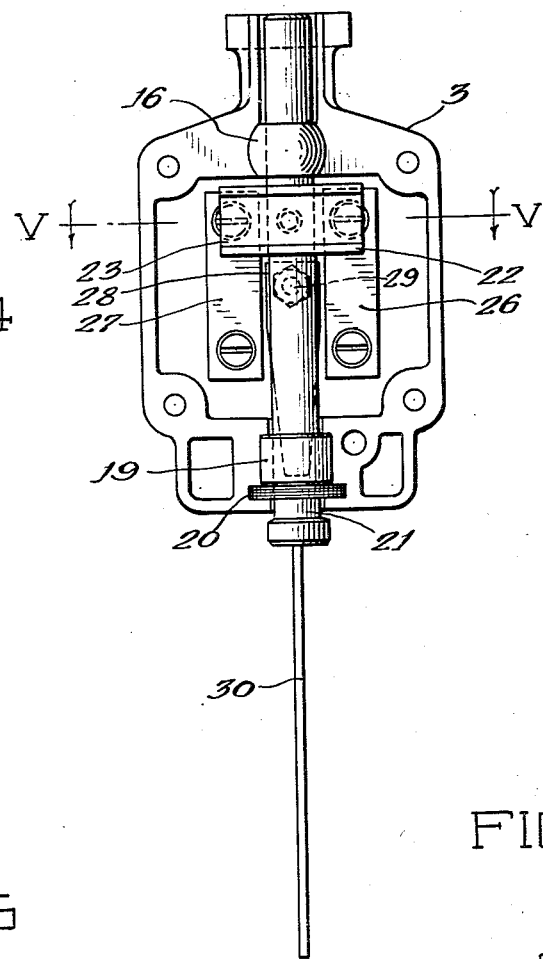
Fig. 4 is an inside view of the front cap removed from the machine, showing the tool plunger and other parts contained in it.
Figure 5:
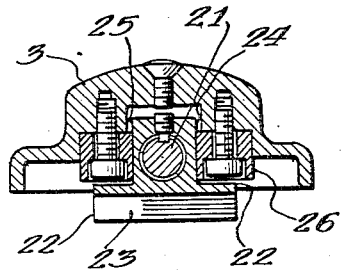
Fig. 5 is a section taken as indicated along the line V—V of Fig. 4.
Figure 6:
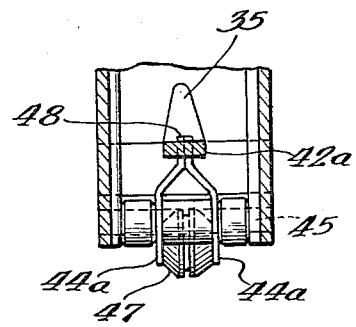
Fig. 6 is a fragmentary section taken as indicated along the line VI—VI of Fig. 2 showing a plan view of the oscillating mechanism.

Referring to the drawings in greater detail, the frame of the machine includes a motor case 1, a gear case member 2, and a front cap 3, to which may be attached a foot plate 4 and a handle 5.

A motor 6 has a shaft 7 journalled in the frame, and the shaft has a pinion 8 protruding into the gear case. A stud 9 is mounted in the gear case parallel to the motor shaft; and a balancing gear 10 and an output gear 11 of the same size are coaxially journalled on the stud in spaced apart relationship, with the balancing gear 10 meshing with the motor pinion and the output gear forward of the balancing gear.

An intermediate pinion 12 is journalled on an intermediate shaft 13 which is supported at one end in the gear case and at its other end in the front cap. Intermediate pinion 12 meshes with the motor pinion 8 and with the output gear 11, imparting to the latter a rotation opposite to that of gear 10, as is shown in Fig. 2.

The gears 10 and 11 are provided with counterbalances 14 and 15 which are effectively in phase. The term "effectively in phase" as used herein means that the counterbalances are so related that they cooperate effectively to counterbalance the composite movements of the other eccentric and reciprocating parts of the mechanism.

The front cap 3 is formed with a pocket 16 containing an upper guide member 17 which is shaped and supported for slight rocking movement. The front cap also has a pocket 18 containing a lower guide member 19 and a resilient washer 20 adapted for lubricant retention.

A tool plunger 21 is arranged for sliding movement in these guide members, and has fixed upon it a crosshead or Scotch yoke member 22. The crosshead is formed with a channel 23 across its rear end and with parallel guiding surfaces 24 and 25 on its sides which have sliding movement between parallel guide members 26 and 27 which are secured in the front cap. There is clearance between the channel portion of the crosshead and the adjacent face of the guide members to permit a slight fore and aft movement of the crosshead.

A spring 28 is secured to the front cap by a screw 29, and bears against the lower guide member 19 to push the guide member and tool plunger rearward. A saw blade 30 or other tool is secured to the lower end of the tool plunger in any suitable manner, and protrudes below the base 4.

Output gear 11 is provided with a crank pin 31, and a roller 32 journalled on the crank pin engages with the channel 23 of the crosshead, whereby rotation of the gear 11 causes endwise reciprocation of the tool plunger and cutting tool.

The lower portions of the motor case 1 and gear case 2 extend downward and form a V-shaped bottom portion 33 which inclines upward from front to rear and provides a chute adapted to funnel air from a fan 34 on the motor shaft toward the cutting point. Inside this chute is a small raised ledge 35 whose front face is in line with the front face of the gear 10.

The base plate 4 has welded to it a bracket 36 which has at its front end a small upstanding portion 37 and at its rear end a larger upstanding portion 38. These upstanding portions are pivoted to the frame by a screw or pin 39, whereby the foot plate may be tilted either way for angular cutting. A clamping screw 40 extends through a slot in the rear upstanding portion and clamps the base in any adjusted position.

Output gear 11 has a rearwardly extending hub upon which is formed an eccentric 41. Upon this is journaled an eccentric strap 42, which has an offset tail 42a extending down and bearing against the front face of the ledge 35. A resilient washer 43 is positioned around the eccentric strap where it goes through the bottom of the gear case for grease retention.

A bell crank member 44 having spaced front legs 44a is pivoted in the frame on a pivot 45, and between its front legs is a pin 46 carrying a roller 47 which bears on the rear edge of the cutting tool. Behind pivot 45 the legs of the bell crank merge and terminate in a generally cylindrical portion 48 which engages in a slot formed in the tail 42a of the eccentric strap 42, whereby vertical movement of the eccentric strap causes horizontal oscillation of the roller and cutting tool. The vertical and horizontal movements of the cutting tool may be proportioned and coordinated to move the cutting tool in an oval path of the nature illustrated in Fig. 3.

The foregoing detailed description is intended for clearness of understanding only and no unnecessary limitations are to be implied therefrom, as variations will be obvious to those skilled in the art.

I claim:

1. A power driven reciprocable cutting tool comprising: a frame; a motor having a shaft journalled in the frame, a drive pinion on said shaft; an intermediate shaft mounted in the frame parallel to said motor shaft; an intermediate pinion journalled on the intermediate shaft in mesh with the drive pinion; a stud fixed in the frame parallel to the motor shaft; two equal sized counterbalanced gears coaxially journalled on the stud with their counterbalances effectively in phase, one of said counterbalanced gears being in mesh with the drive pinion and the other with the intermediate pinion; a tool plunger slidably mounted in the frame parallel to said gears; and means operatively connecting the tool plunger with one of said counterbalanced gears to impart endwise movement to the tool plunger.

2. A power driven reciprocable cutting tool comprising: a frame; a motor having a shaft journalled in the frame; a drive pinion on said shaft; an intermediate shaft mounted in the frame parallel to said motor shaft; an intermediate pinion journaled on the second shaft in mesh with the drive pinion; a stud fixed in the frame parallel to the motor shaft; two equal sized counterbalanced gears coaxially journalled on the stud with their counterbalances effectively in phase, one of said counterbalanced gears being in mesh with the drive pinion and the other with the intermediate pinion; a tool plunger slidably mounted in the frame parallel to said gears; means operatively connecting the tool plunger with one of said counterbalanced gears to impart endwise movement to the tool plunger; a cutting tool secured to the tool plunger; and means in the frame for imparting edgewise oscillatory movement to said cutting tool, said means including an eccentric coaxial with and driven at the same speed as the counterbalanced gears, and connecting means operatively engaging said eccentric and cutting tool.

3. A power driven reciprocable cutting tool comprising: a frame; a motor having a shaft journalled in the frame; a drive pinion on said shaft; an intermediate shaft parallel to the motor shaft; an intermediate pinion on said intermediate shaft which is in mesh with only the forward portion of the drive pinion; a stud mounted in the frame parallel to the motor shaft; a balancing gear on the stud in mesh with only the rear portion of the drive pinion, said balancing gear being provided with a counterbalancing mass; an output gear on said stud coaxial with and spaced forwardly from said balancing gear and in mesh only with said intermediate pinion; a counterbalancing mass on the output gear which is effectively in phase with that in the balancing gear; a tool plunger slidably mounted in the frame forward of and parallel to said gears; and means operatively connecting the tool plunger with said output gear to impart endwise movement to the tool plunger.

4. A power driven, reciprocable cutting tool comprising: a frame; a motor having a shaft journalled in the frame; a stud fixed in the frame parallel to the motor shaft; two equal sized counterbalanced spur gears coaxially journalled on the stud with their counterbalances effectively in phase, one of said gears being forward of the other and in spaced relationship thereto; gear train means including a drive pinion on the motor shaft and an intermediate pinion on a shaft parallel to the motor shaft for rotating said counterbalanced gears in opposite directions at the same speed; a tool plunger slidably mounted in the frame parallel to said gears; means operatively connecting the tool plunger with one of said counterbalanced gears to impart endwise movement to the tool plunger; a cutting tool secured to the tool plunger; eccentric means supported on the stud; and means operatively connected with said eccentric means and imparting edgewise oscillatory movement to the cutting tool.

5. A power driven reciprocable cutting tool comprising: a frame having a perforate, transverse wall dividing it into a motor cavity and a gear case cavity; a motor in the motor cavity having a shaft projecting through the perforate wall into the gear case cavity; an intermediate shaft supported in said transverse wall and extending into the gear case cavity parallel to the motor shaft; a stud mounted in said transverse wall and extending into the gear case cavity parallel to the intermediate shaft; three layers of gears disposed parallel to said transverse wall, there being a rearward layer consisting of a rear portion of a drive pinion on the motor shaft and a balancing gear on the stud, an intermediate layer consisting of the forward portion of said drive pinion and an intermediate pinion on said intermediate shaft, and a forward layer consisting of a portion of said intermediate pinion which is forward of the drive pinion, and an output gear on the stud which is identical and coaxial with said balancing gears; counterbalancing masses on said output gear and said balancing gear, said counterbalancing masses being effectively in phase; a tool plunger slidably mounted in the frame forward of and parallel to said forward layer of gears; and means operatively connecting the tool plunger with said output gear to impart endwise movement to the tool plunger.

6. A power driven, reciprocable cutting tool comprising: a frame; a motor having a shaft journalled in the frame; a drive pinion on said shaft; a stud mounted in the frame parallel to the motor shaft; a pair of identical counterbalanced gears coaxially journalled on the stud with their counterbalances effectively in phase, one of said gears being a front gear which is forward of the drive pinion and the other being a rear gear in the same plane as a portion of said drive pinion; spacer means between said counterbalanced gears and integral with one of them, said spacer means providing an eccentric; means including said drive pinion and an intermediate pinion on a shaft parallel to the motor shaft and meshing with the forward part of the drive pinion and with the front gear for driving said counterbalanced gears in opposite directions at the same speed; a tool plunger slidably mounted in the frame forward of and parallel to said counterbalanced gears; means operatively connecting the tool plunger with the front one of said counterbalanced gears to impart endwise movement to the tool plunger; a cutting tool secured to the tool plunger; and means operatively connecting said eccentric with the cutting tool to thrust the cutting tool edgewise on its cutting stroke.

7. In a power driven reciprocable cutting tool a frame; a motor having a shaft journalled in the frame; a stud fixed in the frame parallel to the motor shaft; two equal sized counterbalanced spur gears coaxially journalled on said stud in spaced apart relation with their counterbalances effectively in phase; a pinion on the motor shaft meshing with the rear gear and having its forward end opposite the space between said gears; an intermediate pinion journalled in the frame parallel to the motor shaft, said pinion having its forward portion meshing with the front gear; and having its rear portion meshing with the motor pinion opposite the space between said gears; a tool plunger slidably mounted in the frame parallel to said gears; and means operatively connecting the tool plunger with said front gear to impart endwise movement to the tool plunger.

8. A power driven reciprocable cutting tool comprising: a frame; a motor having a shaft journalled in the frame; a drive pinion on said shaft; a stud fixed in the frame parallel to the motor shaft; two equal sized counterbalanced spur gears coaxially journalled on said stud in spaced apart relation, the rearward of said gears being a balancing gear and meshing with the motor pinion, and the forward of said gears being an output gear; an intermediate pinion journalled in the frame parallel to the motor shaft and meshing with said output gear, said intermediate pinion and motor pinion extending into and meshing with one another in an area which is between planes defined by the rear of the output gear and the front of the balancing gear; a tool plunger slidably mounted in the frame parallel to said gears; and means operatively connecting the tool plunger with said front gear to impart endwise movement to the tool plunger.

9. A power driven reciprocable cutting tool comprising: a frame; a motor having a shaft journalled in the frame, said shaft being provided with a drive pinion; a stud mounted in the frame parallel to the motor shaft; two equal sized counterbalanced spur gears coaxially journalled on said stud in spaced apart relation, the rear gear meshing with the rear portion of the motor pinion; an intermediate pinion journalled in the frame parallel to the motor shaft and meshing with the forward gear and extending rearwardly into mesh with the forward portion of the motor pinion, whereby the two coaxial gears are revolved in opposite directions at the same speed with their counterbalances effectively in phase; a tool plunger slidably mounted in the frame parallel to said gears; and scotch yoke means operatively connecting the tool plunger with the forward of said gears to impart endwise movement to the tool plunger.

References Cited in the file of this patent

UNITED STATES PATENTS

| | | |
|---|---|---|
| 672,320 | Ford | Apr. 16, 1901 |
| 2,428,924 | Albertson | Oct. 14, 1947 |
| 2,704,941 | Holford | Mar. 29, 1955 |
| 2,775,272 | Papworth | Dec. 25, 1956 |
| 2,781,800 | Papworth | Feb. 19, 1957 |